(12) United States Patent
Hardy

(10) Patent No.: US 10,631,524 B2
(45) Date of Patent: Apr. 28, 2020

(54) DECORATIVE STAND ASSEMBLY

(71) Applicant: Catherine Hardy, North Brunswick, NJ (US)

(72) Inventor: Catherine Hardy, North Brunswick, NJ (US)

( * ) Notice: Subject to any disclaimer, the term of this patent is extended or adjusted under 35 U.S.C. 154(b) by 174 days.

(21) Appl. No.: 15/976,562

(22) Filed: May 10, 2018

(65) Prior Publication Data

US 2019/0343090 A1 Nov. 14, 2019

(51) Int. Cl.
*A01K 63/00* (2017.01)
*A01G 9/20* (2006.01)
*A01G 7/04* (2006.01)
*F16M 11/22* (2006.01)

(52) U.S. Cl.
CPC ............ *A01K 63/003* (2013.01); *A01G 7/045* (2013.01); *A01G 9/20* (2013.01); *F16M 11/22* (2013.01); *F16M 2200/00* (2013.01)

(58) Field of Classification Search
CPC .... A01K 63/003; A01K 63/00; A01K 63/006; A01G 31/02; A01G 2031/006
USPC .......................... 119/246, 247; D30/101, 104
See application file for complete search history.

(56) References Cited

U.S. PATENT DOCUMENTS

| 919,157 | A | * | 4/1909 | Glaser | ..................... B05B 17/08 239/20 |
| 4,117,805 | A | | 10/1978 | Ward | |
| 4,351,270 | A | | 9/1982 | Sabin | |
| D302,055 | S | | 7/1989 | Gallagher | |
| 5,040,489 | A | | 4/1991 | Drake | |
| 5,056,463 | A | | 10/1991 | Wilkins | |
| 5,127,366 | A | | 7/1992 | Kim | |
| 5,775,260 | A | * | 7/1998 | Jansen | ................. A01K 63/006 119/246 |
| 5,970,918 | A | * | 10/1999 | Bargy | .................. A01K 63/003 119/246 |
| 6,442,893 | B1 | * | 9/2002 | Lai | .......................... A01G 31/02 47/14 |
| 7,861,942 | B2 | * | 1/2011 | Damon | .................. B05B 17/085 239/16 |
| 2008/0072835 | A1 | * | 3/2008 | Hongtawornsiri | ....... A01G 9/02 119/246 |
| 2011/0203526 | A1 | | 8/2011 | Kilroy | |
| 2014/0223819 | A1 | * | 8/2014 | Coghlan | ............... A01K 63/045 47/62 R |
| 2015/0250134 | A1 | * | 9/2015 | Hicks | ....................... A01K 1/03 119/246 |
| 2019/0343091 | A1 | * | 11/2019 | Weiner | ................. A01G 27/005 |

* cited by examiner

*Primary Examiner* — Magdalena Topolski
*Assistant Examiner* — Katelyn T Truong

(57) ABSTRACT

A decorative stand assembly for combining a terrarium, an aquarium and a waterfall includes a terrarium for housing plant life. The terrarium has a plurality of first windows therein for viewing an interior of the terrarium. A waterfall housing is positioned on the terrarium and the waterfall housing has a plurality of second windows for viewing an interior of the waterfall housing. A pump is positioned within the waterfall housing to pump a fluid into the waterfall housing for simulating a waterfall. An aquarium is coupled to the waterfall housing to house fish.

13 Claims, 5 Drawing Sheets

DECORATIVE STAND ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to decorative assemblies and more particularly pertains to a new decorative assembly for combining a terrarium, an aquarium and a waterfall.

BRIEF SUMMARY OF THE INVENTION

An embodiment of the disclosure meets the needs presented above by generally comprising a terrarium for housing plant life. The terrarium has a plurality of first windows therein for viewing an interior of the terrarium. A waterfall housing is positioned on the terrarium and the waterfall housing has a plurality of second windows for viewing an interior of the waterfall housing. A pump is positioned within the waterfall housing to pump a fluid into the waterfall housing for simulating a waterfall. An aquarium is coupled to the waterfall housing to house fish.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
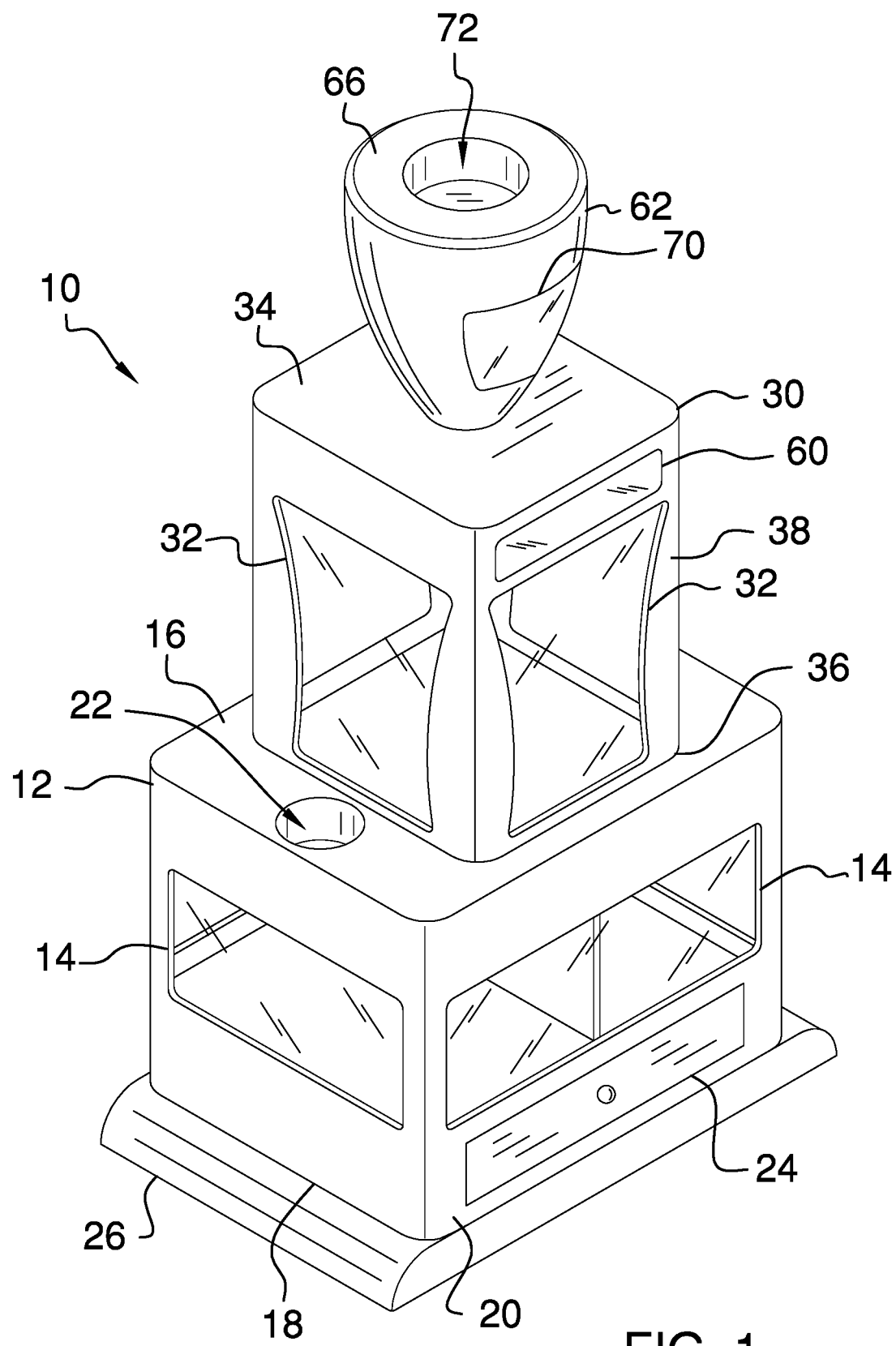
FIG. 1 is a top perspective view of a decorative stand assembly according to an embodiment of the disclosure.
Figure 2:
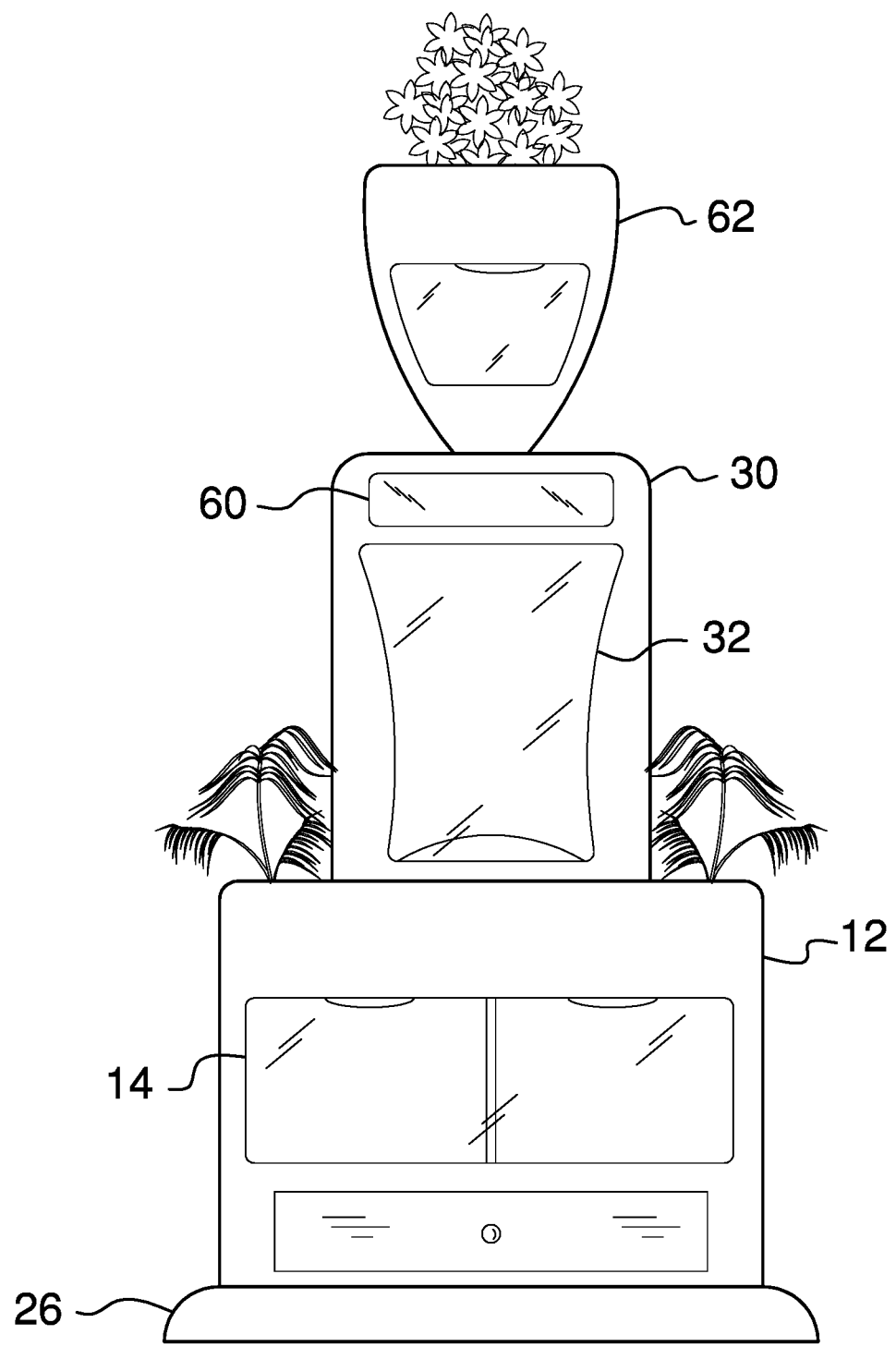
FIG. 2 is a front view of an embodiment of the disclosure.
Figure 3:
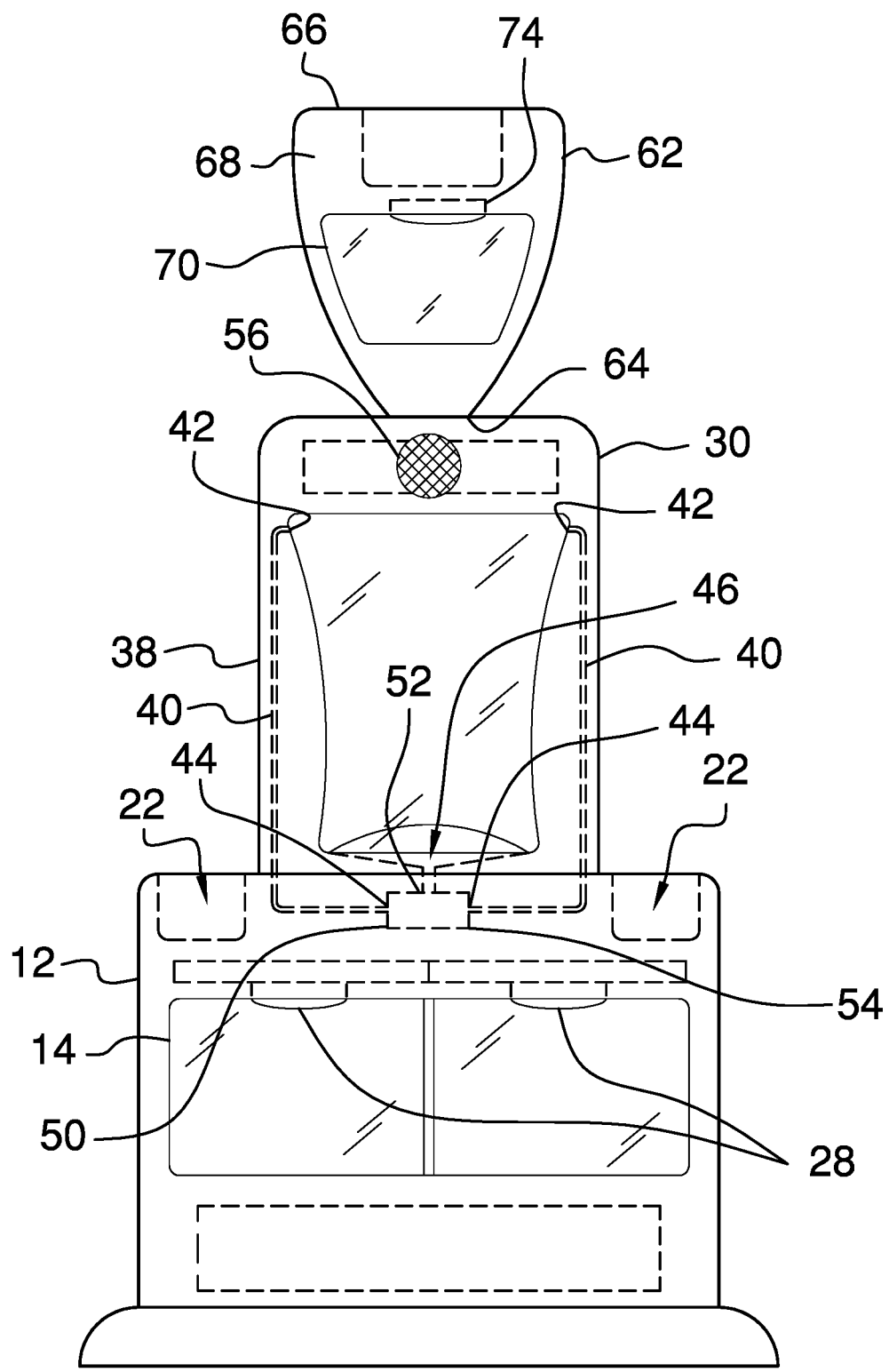
FIG. 3 is a back phantom view of an embodiment of the disclosure.
Figure 4:
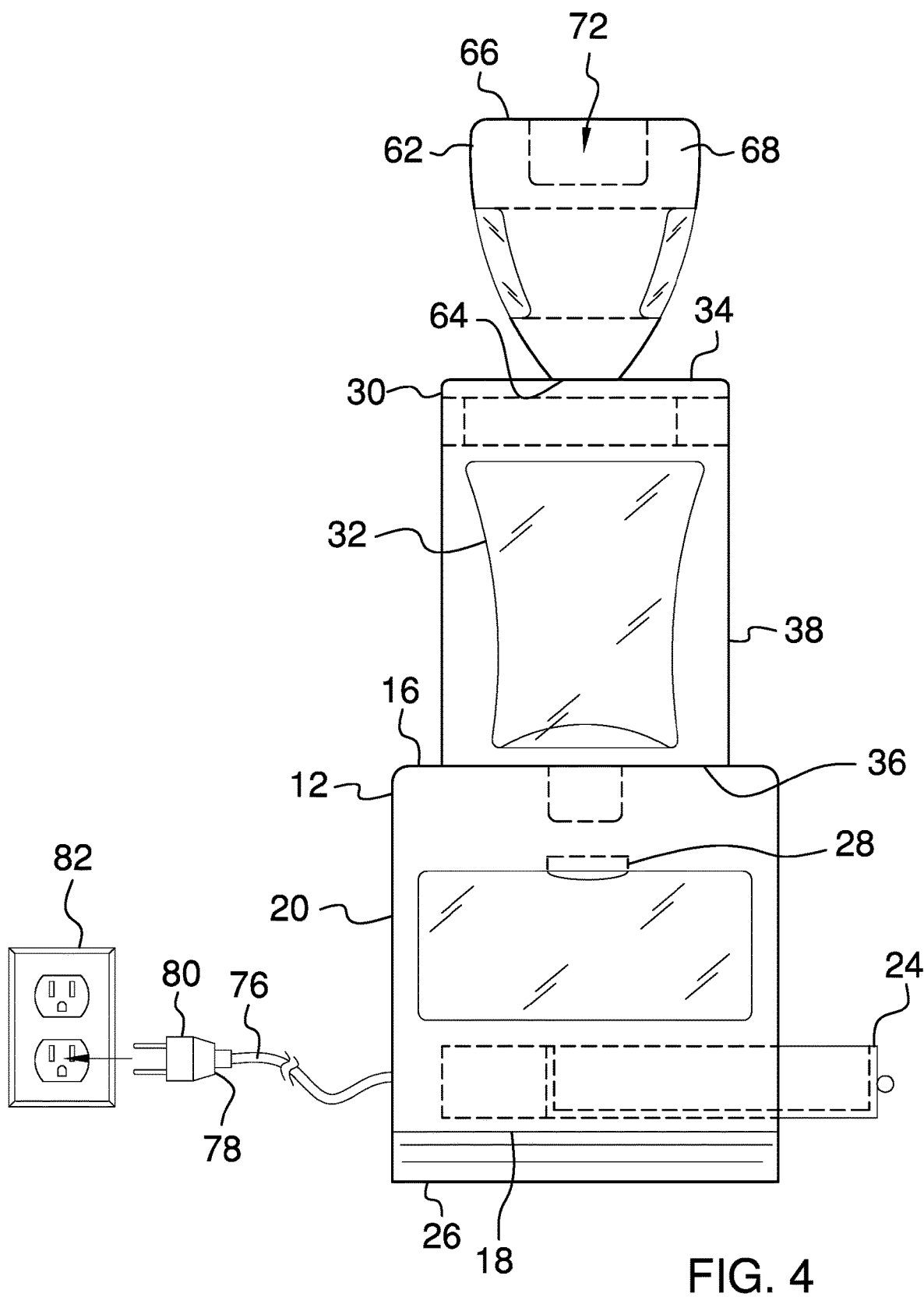
FIG. 4 is a right side phantom view of an embodiment of the disclosure.
Figure 5:
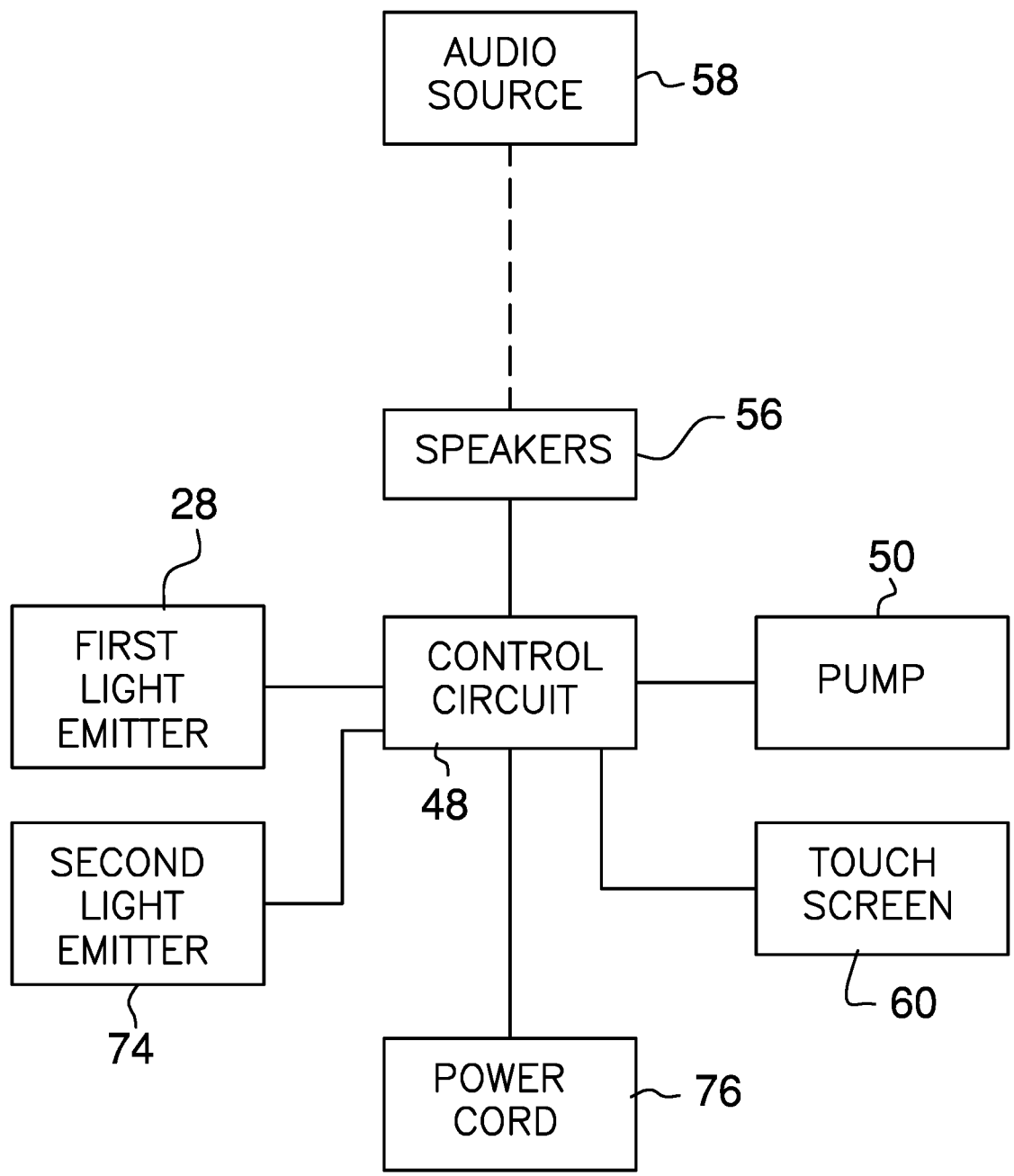
FIG. 5 is a schematic view of an embodiment of the disclosure.

With reference now to the drawings, and in particular to FIGS. 1 through 5 thereof, a new decorative assembly embodying the principles and concepts of an embodiment of the disclosure and generally designated by the reference numeral 10 will be described.

As best illustrated in FIGS. 1 through 5, the decorative stand assembly 10 generally comprises a terrarium 12 for housing plant life. The terrarium 12 has a plurality of first windows 14 therein for viewing an interior of the terrarium 12. The terrarium 12 has a top wall 16, a bottom wall 18 and an outer wall 20 extending therebetween. Each of the first windows 14 extends through the outer wall 20 and the first windows 14 are distributed around the outer wall 20. The top wall 16 has a plurality of first wells 22 each extending downwardly to contain a plant pot. A drawer 24 is slidably positioned in the terrarium 12 for storage and the drawer 24 is positioned in the outer wall 20 of the terrarium 12. Moreover, the drawer 24 is positioned between a respective one of the first windows 14 and the bottom wall 18 of the terrarium 12.

A base 26 is coupled to the bottom wall 18 of the terrarium 12 and the base 26 abuts a support surface, such as a floor or the like. A plurality of first light emitters 28 is each positioned within the terrarium 12 for illuminating an interior of the terrarium 12. Each of the first light emitters 28 is positioned on the top wall 16 of the terrarium 12 and each of the first light emitters 28 may comprise an LED grow light or the like that emits the wavelength of light most utilized by plants.

A waterfall housing 30 is provided and the waterfall housing 30 is positioned on the terrarium 12. The waterfall housing 30 has a plurality of second windows 32 for viewing an interior of the waterfall housing 30. The waterfall housing 30 has an upper wall 34, a lower wall 36 and an exterior wall 38 extending therebetween. Each of the second windows 32 extends through the exterior wall 38 and the second windows 32 are distributed around the exterior wall 38. The lower wall 36 is coupled to the top wall 16 of the terrarium 12 and the waterfall housing 30 extends upwardly from the terrarium 12.

The exterior wall 38 has a plurality of conduits 40 therein and each of the conduits 40 has a first end 42 and a second end 44. The first end 42 of each of the conduits 40 extends through the exterior wall 38 and into the interior of the waterfall housing 30 adjacent to the upper wall 34 of the waterfall housing 30. The lower wall 36 of the waterfall housing 30 has a drain 46 extending downwardly therein. A control circuit 48 is coupled to the waterfall housing 30 and each of the first light emitters 28 is electrically coupled to the control circuit 48.

A pump 50 is positioned within the waterfall housing 30. The pump 50 urges a fluid, such as water or the like, into the waterfall housing 30 for simulating a waterfall. The pump 50 is electrically coupled to the control circuit 48 and the pump 50 has an input 52 and an output 54. The second end 44 of each of the conduits 40 is fluidly coupled to the output 54 and the pump 50 urges the fluid outwardly through the first end 42 of each of the conduits 40. In this way the fluid falls downwardly in the waterfall housing 30 for simulating the waterfall. Rocks or other objects can be positioned within the waterfall housing 30 to enhance the visual effect of the simulated waterfall. The input 52 is fluidly coupled to the drain 46 and the drain 46 captures the falling fluid for recirculating the fluid through the pump 50.

A plurality of speakers 56 is included and each of the speakers 56 is coupled to the exterior wall 38 of the waterfall housing 30 to emit audible sound outwardly therefrom. Each of the speakers 56 is electrically coupled to the control circuit 48 and each of the speakers 56 is in electrical communication with an audio source 58. The audio source 58 may be an extrinsic electronic device such as a smart phone or a personal computer. Additionally, the speakers 56 may be Bluetooth speakers 56 or the like that can wirelessly communicate with the audio source 58.

A touch screen 60 is coupled to the waterfall housing 30 and the touch screen 60 is electrically coupled to the control circuit 48. The touch screen 60 controls operational parameters of the pump 50, the first light emitters 28 and the speakers 56. The touch screen 60 may be an LED touch screen or any other conventional form of electronic touch screen 60.

An aquarium 62 is coupled to the waterfall housing 30 and the aquarium 62 houses fish. The aquarium 62 has a basal wall 64, an uppermost wall 66 and an outside wall 68 extending therebetween. The outside wall 68 curves inwardly between the uppermost wall 66 and the basal wall 64 such that the aquarium 62 has a bullet shape. The basal wall 64 is coupled to the upper wall 34 of the waterfall housing 30 and the outside wall 68 has a third window 70 extending into an interior of the aquarium 62. The uppermost wall 66 has a second well 72 extending downwardly therein wherein the second well 72 is configured to contain a plant pot.

A second light emitter 74 is positioned within the aquarium 62 for illuminating the interior of the aquarium 62. The second light emitter 74 is positioned on the uppermost most wall of the aquarium 62 and the second light emitter 74 is electrically coupled to the control circuit 48. The second light emitter 74 may comprise an LED or the like. A power cord 76 is coupled to the terrarium 12 and the power cord 76 is electrically coupled to the control circuit 48. The power cord 76 has a distal end 78 with respect to the terrarium 12 and a plug 80 is electrically coupled to the distal end 78. The plug 80 may be electrically coupled to a power source 82 such as a female electrical outlet or the like.

In use, any desired combination and arrangement of plants is placed in the terrarium 12 for viewing pleasure. Additionally, a selected species of fish, such as goldfish, beta and other fish common to freshwater aquariums are housed in the aquarium 62. In this way the terrarium 12, the aquarium 62 and the waterfall housing 30 enhance visual appeal of area in which each of the terrarium 12, aquarium 62 and waterfall housing 30 are placed. The touch screen 60 is manipulated to control the operational parameters of the pump 50, the first light emitters 28, the second light emitter 74 and the speakers 56. Additionally, plant pots are positioned in each of the first 22 and second 72 wells for viewing pleasure.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A decorative stand assembly combining a waterfall, a terrarium and an aquarium, said assembly comprising:
   a terrarium for housing plant life, said terrarium having a plurality of first windows therein for viewing an interior of said terrarium;
   a waterfall housing being positioned on said terrarium, said waterfall housing having a plurality of second windows for viewing an interior of said waterfall housing;
   a pump being positioned within said waterfall housing wherein said pump is configured to pump a fluid into said waterfall housing for simulating a waterfall; and
   an aquarium being coupled to said waterfall housing wherein said aquarium is configured to house fish wherein said terrarium has a top wall, a bottom wall and an outer wall extending therebetween, each of said first windows extending through said outer wall, said first windows being distributed around said outer wall, said top wall having a plurality of first wells each extending downwardly therein wherein each of said first wells is configured to contain a plant pot;
   wherein said waterfall housing has an upper wall, a lower wall and an exterior wall extending therebetween, each of said second windows extending through said exterior wall, said second windows being distributed around said exterior wall, said lower wall being coupled to said top wall of said terrarium having said waterfall housing extending upwardly from said terrarium;
   wherein said aquarium has a basal wall, an uppermost wall and an outside wall extending therebetween, said outside wall curving inwardly between said uppermost wall and said basal wall such that said aquarium has a bullet shape, said basal wall being coupled to said upper wall of said waterfall housing.

2. The assembly according to claim 1, further comprising a drawer being slidably positioned in said terrarium for storage, said drawer being positioned in said outer wall of said terrarium, said drawer being positioned between a respective one of said first windows and said bottom wall of said terrarium.

3. The assembly according to claim 1, further comprising a plurality of first light emitters, each of said first light emitters being positioned within said terrarium for illuminating an interior of said terrarium, each of said first light emitters being positioned on said top wall of said terrarium.

4. The assembly according to claim 3, further comprising a control circuit being coupled to said waterfall housing; each of said first light emitters being electrically coupled to said control circuit.

5. The assembly according to claim 4, further comprising a touch screen being coupled to said waterfall housing, said touch screen being electrically coupled to said control circuit.

6. The assembly according to claim 1, wherein said exterior wall has a plurality of conduits therein, each of said conduits having a first end and a second end, said first end of each of said conduits extending through said exterior wall and into said interior of said waterfall housing adjacent to said upper wall of said waterfall housing.

7. The assembly according to claim 6, wherein said lower wall of said waterfall housing has a drain extending downwardly therein.

8. The assembly according to claim 6, wherein:
said waterfall housing has a control circuit positioned therein; and
said pump is electrically coupled to said control circuit, said pump has an input and an output, said second end of each of said conduits being fluidly coupled to said output wherein said pump is configured to urge the fluid outwardly through said first end of each of said conduits thereby facilitating the fluid to fall downwardly in said waterfall housing, said input being fluidly coupled to a drain wherein said drain is configured to capture the falling fluid for recirculating the fluid through said pump.

9. The assembly according to claim 1, further comprising:
a control circuit; and
a plurality of speakers, each of said speakers being coupled to said exterior wall of said waterfall housing wherein each of said speakers is configured to emit audible sound outwardly therefrom, each of said speakers being electrically coupled to said control circuit, each of said speakers being in electrical communication with an audio source.

10. The assembly according to claim 1, wherein said outside wall has a third window extending into an interior of said aquarium, said uppermost wall having a second well extending downwardly therein wherein said second well is configured to contain a plant pot.

11. The assembly according to claim 1, further comprising a second light emitter being positioned within said aquarium for illuminating an interior of said aquarium, said second light emitter being positioned on said uppermost wall of said aquarium.

12. The assembly according to claim 1, further comprising a power cord being coupled to said terrarium, said power cord being electrically coupled to a control circuit, said power cord having a distal end with respect to said terrarium, said distal end having a plug being electrically coupled thereto, said plug being configured to be electrically coupled to a power source.

13. A decorative stand assembly combining a waterfall, a terrarium and an aquarium, said assembly comprising:
a terrarium for housing plant life, said terrarium having a plurality of first windows therein for viewing an interior of said terrarium, said terrarium having a top wall, a bottom wall and an outer wall extending therebetween, each of said first windows extending through said outer wall, said first windows being distributed around said outer wall, said top wall having a plurality of first wells each extending downwardly therein wherein each of said first wells is configured to contain a plant pot;
a drawer being slidably positioned in said terrarium for storage, said drawer being positioned in said outer wall of said terrarium, said drawer being positioned between a respective one of said first windows and said bottom wall of said terrarium;
a base being coupled to said bottom wall of said terrarium wherein said base is configured to abut a support surface;
a plurality of first light emitters, each of said first light emitters being positioned within said terrarium for illuminating an interior of said terrarium, each of said first light emitters being positioned on said top wall of said terrarium;
a waterfall housing being positioned on said terrarium, said waterfall housing having a plurality of second windows for viewing an interior of said waterfall housing, said waterfall housing having an upper wall, a lower wall and an exterior wall extending therebetween, each of said second windows extending through said exterior wall, said second windows being distributed around said exterior wall, said lower wall being coupled to said top wall of said terrarium having said waterfall housing extending upwardly from said terrarium, said exterior wall having a plurality of conduits therein, each of said conduits having a first end and a second end, said first end of each of said conduits extending through said exterior wall and into said interior of said waterfall housing adjacent to said upper wall of said waterfall housing, said lower wall of said waterfall housing having a drain extending downwardly therein;
a control circuit being coupled to said waterfall housing; each of said first light emitters being electrically coupled to said control circuit;
a pump being positioned within said waterfall housing wherein said pump is configured to pump a fluid into said waterfall housing for simulating a waterfall, said pump being electrically coupled to said control circuit, said pump having an input and an output, said second end of each of said conduits being fluidly coupled to said output wherein said pump is configured to urge the fluid outwardly through said first end of each of said conduits thereby facilitating the fluid to fall downwardly in said waterfall housing, said input being fluidly coupled to said drain wherein said drain is configured to capture the falling fluid for recirculating the fluid through said pump;
a plurality of speakers, each of said speakers being coupled to said exterior wall of said waterfall housing wherein each of said speakers is configured to emit audible sound outwardly therefrom, each of said speakers being electrically coupled to said control circuit, each of said speakers being in electrical communication with an audio source;
a touch screen being coupled to said waterfall housing, said touch screen being electrically coupled to said control circuit such that said touch screen controls operational parameters of said pump, said first light emitters and said speakers;
an aquarium being coupled to said waterfall housing wherein said aquarium is configured to house fish, said aquarium having a basal wall, an uppermost wall and an outside wall extending therebetween, said outside wall curving inwardly between said uppermost wall and said basal wall such that said aquarium has a bullet shape, said basal wall being coupled to said upper wall of said waterfall housing, said outside wall having a third window extending into an interior of said aquarium, said uppermost wall having a second well extending downwardly therein wherein said second well is configured to contain a plant pot;

a second light emitter being positioned within said aquarium for illuminating said interior of said aquarium, said second light emitter being positioned on said uppermost wall of said aquarium, said second light emitter being electrically coupled to said control circuit; and a power cord being coupled to said terrarium, said power cord being electrically coupled to said control circuit, said power cord having a distal end with respect to said terrarium, said distal end having a plug being electrically coupled thereto, said plug being configured to be electrically coupled to a power source.

\* \* \* \* \*